(12) United States Patent
Means et al.

(10) Patent No.: US 11,512,512 B2
(45) Date of Patent: Nov. 29, 2022

(54) DOOR TRANSLATION HINGE ASSEMBLY

(71) Applicant: The Boeing Company, Chicago, IL (US)

(72) Inventors: Ryan M. Means, Charleston, SC (US); Kenny K. Huynh, Bothwell, WA (US); Wayne H. Peterson, Snohomish, WA (US); Michael A. Fleming, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 16/860,508

(22) Filed: Apr. 28, 2020

(65) Prior Publication Data

US 2021/0332624 A1  Oct. 28, 2021

(51) Int. Cl.
*E05D 3/06* (2006.01)
*E05D 7/00* (2006.01)
*B64C 1/14* (2006.01)

(52) U.S. Cl.
CPC .............. *E05D 7/009* (2013.01); *B64C 1/143* (2013.01); *E05D 3/06* (2013.01); *E05Y 2201/638* (2013.01); *E05Y 2900/502* (2013.01)

(58) Field of Classification Search
CPC . Y10T 16/554; Y10T 16/551; Y10T 16/5385; Y10T 16/5383; Y10T 16/547; Y10T 16/53864; E05D 7/04; E05D 7/06; E05D 7/0407; E05D 7/0415; E05D 7/009; E05D 3/186; E05D 3/06; E05D 3/122; E05D 3/12; E05D 3/14; E05D 3/16; E05D 2003/163; E05D 11/06; E05D 5/0276; E05Y 2201/618; E05Y 2201/62; E05Y 2201/71; E05Y 2201/716; E05Y 2201/712; E05Y 2900/20; E05Y 2900/502; E05Y 2201/638; E05F 3/20; E05F 5/006

See application file for complete search history.

(56) References Cited

U.S. PATENT DOCUMENTS

| | | | | |
|---|---|---|---|---|
| 4,854,010 A * | 8/1989 | Maraghe | ............... | B64C 1/1407 49/248 |
| 5,103,532 A * | 4/1992 | Youngdale | .......... | E05D 11/1021 16/370 |
| 7,357,354 B2 | 4/2008 | Mortland | | |
| 8,919,699 B2 * | 12/2014 | Kress | .................... | B64C 1/1407 244/129.4 |
| 9,441,407 B2 * | 9/2016 | Zetti | ......................... | E05F 3/18 |
| 9,834,973 B2 * | 12/2017 | Tomatsu | .................. | E05F 5/02 |
| 10,189,556 B2 * | 1/2019 | Minchau | ............... | B64C 1/1423 |

(Continued)

*Primary Examiner* — Chuck Y Mah
(74) *Attorney, Agent, or Firm* — Quinn IP Law

(57) ABSTRACT

An aircraft door translation hinge assembly connects a passenger door of an aircraft to the aircraft fuselage structure and enables the passenger door to move through a desired opening motion. The opening motion of the passenger door is controlled by a simplified mechanism that utilizes a pair of linkages connected by a cam surface follower that engages in sliding engagement with a cam surface. The simplified mechanism controls a pivoting movement of the passenger door as the passenger door is first opened, and then controls a translation movement of the passenger door as the passenger door is continued to be opened from a passenger door opening in the aircraft fuselage.

20 Claims, 10 Drawing Sheets

(56) References Cited

U.S. PATENT DOCUMENTS

| | | | | |
|---|---|---|---|---|
| 2001/0039762 A1* | 11/2001 | Giovannetti | .......... | E05F 1/1091 |
| | | | | 49/246 |
| 2006/0202087 A1* | 9/2006 | Mortland | .............. | B64C 1/1407 |
| | | | | 244/129.5 |
| 2008/0276428 A1* | 11/2008 | Clausen | .................. | E05D 3/127 |
| | | | | 16/354 |
| 2010/0109497 A1* | 5/2010 | Blersch | ................ | E05D 15/408 |
| | | | | 312/405 |
| 2012/0117884 A1* | 5/2012 | Oshima | .................... | E05D 3/18 |
| | | | | 16/362 |
| 2017/0218671 A1* | 8/2017 | Frank | ........................ | E05D 7/06 |
| 2020/0255116 A1* | 8/2020 | Chadwell | .................. | E05D 3/12 |

\* cited by examiner

DOOR TRANSLATION HINGE ASSEMBLY

FIELD

This disclosure pertains to an aircraft door translation hinge assembly. In particular, this disclosure pertains to a hinge assembly of an aircraft door that connects a passenger door of an aircraft to the aircraft fuselage and enables the passenger door to move through a desired opening motion. The opening motion of the door is controlled by a simplified mechanism that utilizes a pair of linkages connected by a cam surface follower that engages in sliding engagement with a cam surface. The simplified mechanism controls a pivoting movement of the door as the door is first opened and then controls a translation movement of the door as the door is continued to be opened.

BACKGROUND

A typical hinge assembly of an aircraft door connecting the aircraft door to the aircraft fuselage controls different motions of the passenger door as the door is opened. The different motions that a passenger door of an aircraft goes through as the door is opened include a pivoting movement of the passenger door relative to the aircraft fuselage, and then a translation movement of the aircraft door relative to the aircraft fuselage and away from the door opening in the aircraft fuselage. The different motions of the passenger door relative to the aircraft fuselage as the door is opened are produced by separate mechanisms that control the pivoting movement of the door and the translation movement of the door. The typical aircraft passenger door also includes flight lock mechanisms that are put in place to ensure that if the door is opened during flight, the door won't be blown entirely open by the force of the air flowing between an edge of the door and the aircraft fuselage. Some aircraft passenger door designs require the use of a secondary mechanism that starts by cocking the door open in such a way, that if it were open during flight, it would blow shut due to the force of the air traveling along the exterior of the aircraft fuselage impacting with the aircraft door. Additional mechanisms are needed in these types of designs in order to continue translating the door until it is fully opened. The translation motion of the door as it is opened is preferred by airlines because the motion to open the door is more ergonomic and the door sweep path takes up less space. The existing aircraft passenger door hinge assembly require additional parts and complexity in order to achieve the desired passenger door opening motion. The additional parts and complexity increase the cost of the hinge assembly and make manufacturing the parts of the hinge assembly more difficult and more expensive.

SUMMARY

The door translation hinge assembly of this disclosure has a simplified construction. The simplified construction has a reduced number of parts and eliminates the need for additional, separate mechanisms that would need to be installed in an aircraft passenger door in order to drive the different motions of the door.

The door translation hinge assembly includes a hinge box. The hinge box has a length between a first end of the hinge box and a second end of the hinge box. The first end of the hinge box is connected to a structure of the aircraft, for example the aircraft fuselage structure adjacent a passenger door opening. The connection of the hinge box to the aircraft fuselage structure enables relative pivoting movement between the hinge box and the aircraft fuselage structure. The second end of the hinge box is connected to a door fitting of a door pivot assembly. The connection of the hinge box to the door fitting enables relative pivoting movement between the hinge box and the door fitting.

There is a cam surface on the hinge box. The cam surface is positioned on the hinge box intermediate the first end of the hinge box and the second end of the hinge box. The cam surface is part of a cam slot on the hinge box.

The door translation hinge assembly also includes a first linkage. The first linkage has a length between a first end of the first linkage and a second end of the first linkage. The length of the first linkage is a straight, fixed length between the first end of the first linkage and the second end of the first linkage. The first end of the first linkage is connected to the aircraft fuselage structure by a first linkage pivot connection. The first linkage pivot connection enables relative pivoting movement between the first linkage and the aircraft fuselage structure.

The hinge assembly further includes a second linkage. The second linkage has a length between a first end of the second linkage and a second end of the second linkage. The length of the second linkage is a straight, fixed length between the first end of the second linkage and the second end of the second linkage. The first end of the second linkage is connected to the door fitting of the door pivot assembly, and to the second end of the hinge box by the door fitting. The first end of the second linkage is connected to the door fitting by a second linkage pivot connection. The second linkage pivot connection enables relative pivoting movement between the second linkage and the door fitting, and between the second linkage and the hinge box by the door fitting.

The door fitting is attached to an aircraft door, for example an aircraft passenger door. Thus, the door pivot assembly connects the door fitting to the first end of the second linkage and to the second end of the hinge box. The door pivot assembly has a door fitting pivot connection connecting the door fitting to the second end of the hinge box that enables relative pivoting movement between the second end of the hinge box and the door fitting. The door pivot assembly connected to the first end of the second linkage and the hinge box enables relative pivoting movement between the second linkage and the hinge box.

A cam surface follower is connected to the second end of the first linkage and is connected to the second end of the second linkage. The cam surface follower is received in the cam slot and engages with the cam surface for sliding movement of the cam surface follower along the cam surface and the length of the cam slot. The cam surface follower is a pivot connection between the second end of the first linkage and the second end of the second linkage. The pivot connection provided by the cam surface follower enables relative pivoting movement between the first linkage and the second linkage about the cam surface follower.

The features, functions, and advantages that have been discussed can be achieved independently in various embodiments or may be combined in yet other embodiments, further details of which can be seen with reference to the following description and drawings.

DETAILED DESCRIPTION

Figure 1:
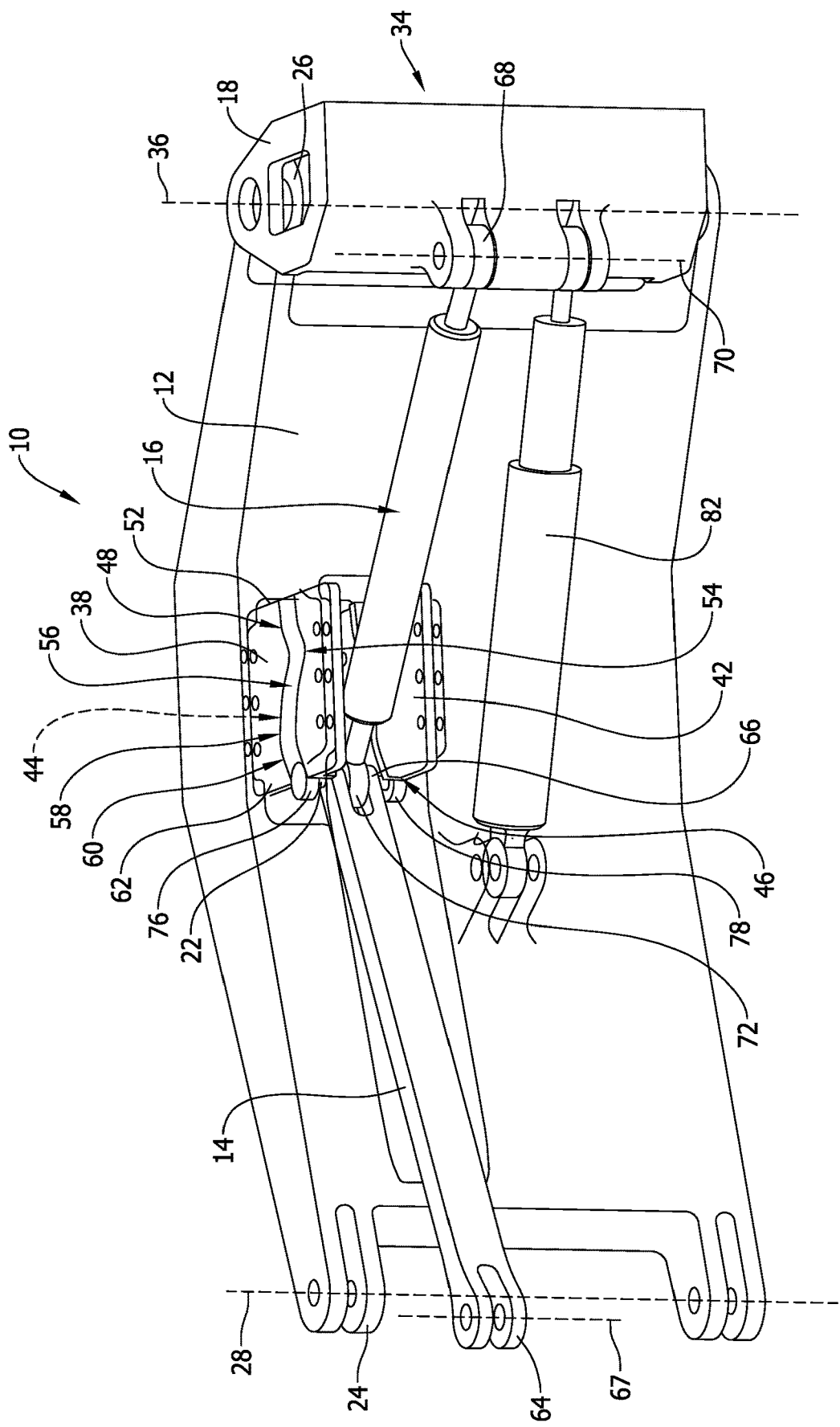
FIG. 1 is a representation of a perspective view of the door translation hinge assembly of this disclosure.

As stated earlier, the door translation hinge assembly 10 of this disclosure has a simplified construction. The simplified construction has a reduced number of parts, and eliminates the need for additional, separate mechanisms that would need to be installed in an aircraft passenger door in order to drive the different motions of the door. The door translation hinge assembly is basically comprised of a hinge box 12, a first linkage 14, a second linkage 16, a door fitting 18 and a cam surface follower 22. Each of these component parts is constructed of a material that provides the component part with sufficient strength to function in its intended manner. The materials could include lightweight metals, composite materials or other equivalent materials.

The hinge box 12 has a length between a first end 24 of the hinge box and a second end 26 of the hinge box. In use, the hinge box 12 structurally supports an aircraft door, such as a passenger door, on an aircraft structure, such as the aircraft fuselage adjacent a passenger door opening in the aircraft fuselage. The first end 24 of the hinge box 12 is connected to a structure of the aircraft, for example the aircraft fuselage structure adjacent a passenger door opening of the aircraft fuselage. The first end 24 of the hinge box 12 is connected to the structure of the aircraft by a hinge box pivot connection that enables relative pivoting movement between the hinge box 12 and the fuselage structure of the aircraft about a first pivot axis 28. The pivot connection between the first end 24 of the hinge box 12 and the aircraft fuselage structure could be provided by a pivot pin connection, or any other equivalent pivot connection. As represented in FIG. 1, the pivot connection of the hinge box 12 to the aircraft fuselage structure enables pivoting movement of the hinge box 12 about the first pivot axis 28 relative to the aircraft fuselage.

The second end 26 of the hinge box 12 is connected to a door fitting 18 of a door pivot assembly 34. The door fitting 18 is configured for attachment to an aircraft door, such as a passenger door of the aircraft. The door fitting 18 is connected to the second end 26 of the hinge box 12 by a door fitting pivot connection for relative pivoting movement between the door fitting 18 and the hinge box 12 about a second pivot axis 36. The first pivot axis 28 and the second pivot axis 36 are both vertically oriented axes and are parallel axes. The pivot connection between the door fitting 18 and the second end 26 of the hinge box 12 at the second pivot axis 36 could be provided by a simple pivot pin connection, or any other equivalent pivot connection that enables relative pivoting movement between the door fitting 18 and the second end 26 of the hinge box 12 about the second pivot axis 36.

The hinge box 12 also provides support for other components of the door translation hinge assembly 10. These other components include an upper cam flange 38 and a lower cam flange 42. As represented in FIG. 1, both the upper cam flange 38 and the lower cam flange 42 project outwardly from the hinge box 12 and are positioned intermediate the first end 24 of the hinge box and the second end 26 of the hinge box. In an alternative, equivalent design of the hinge box 12, the upper cam flange 38 and lower cam flange 42 could be built into the hinge box 12 and integral with the hinge box 12. The upper cam flange 38 and lower cam flange 42 are horizontally oriented and are spaced vertically from each other. There is a cam surface defined by a cam slot 44 in an interior surface of the upper cam flange 38 that opposes the lower cam flange 42. There is also a cam surface defined by a cam slot 46 in an interior surface of the lower cam flange 42 that opposes the upper cam flange 38. The cam surface 44 of the upper cam flange 38 and the cam surface 46 of the lower cam flange 42 are mirror images of each other. Only the configuration of the cam surface 44 of the upper cam flange 38 is described herein, with it being understood that the configuration of the cam surface 46 of the lower cam flange 42 is the same configuration as the cam surface 44 of the upper cam flange 38.

Figure 2:
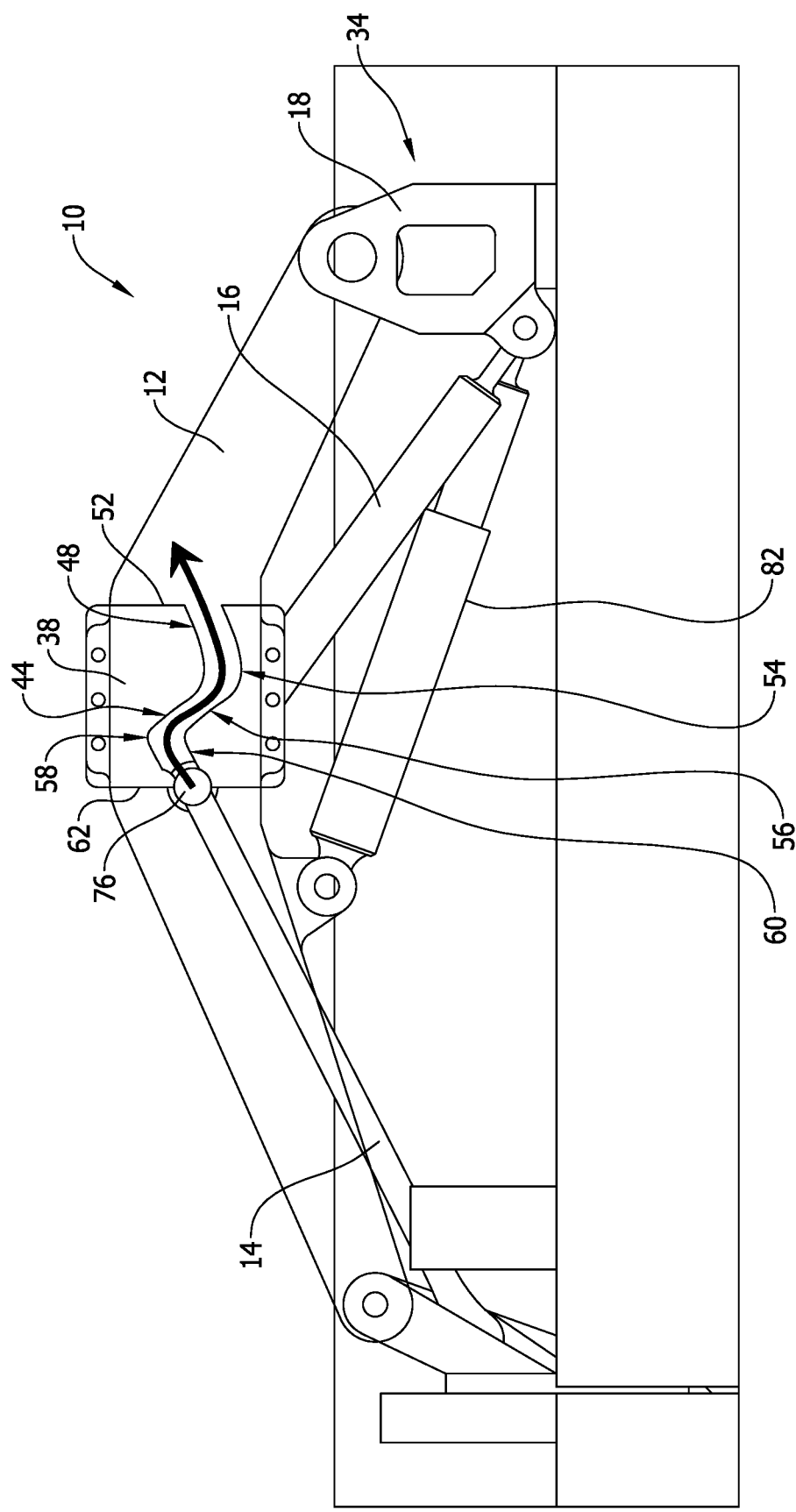
FIG. 2 is a representation of a plan view of the door translation hinge assembly of FIG. 1.
Figure 3:
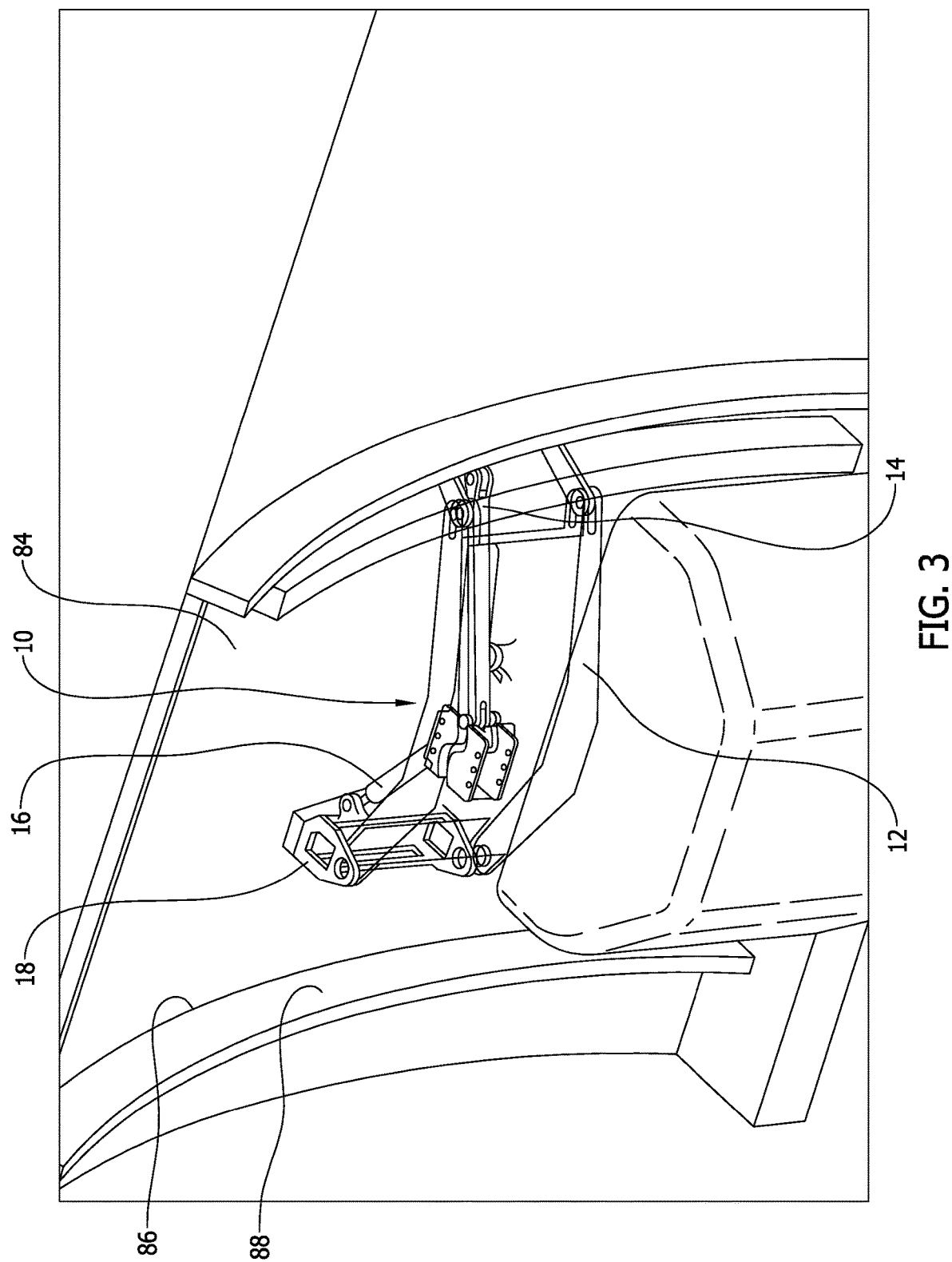
FIG. 3 is a representation of a top perspective view of the door translation hinge assembly connected between an aircraft structure or fuselage of an aircraft and an aircraft passenger door in an aircraft passenger door opening.

As represented in FIGS. 1 and 2, a first portion 48 of the cam surface or cam slot 44 extends from a first edge 52 of the upper cam flange 38 toward the hinge box 12. The cam surface or cam slot 44 in the upper cam flange 38 then extends through a second portion or curved portion 54 of the cam surface or cam slot 44. The cam surface or cam slot 44 in the upper cam flange 38 then extends through a third portion 56 of the cam surface or cam slot that angles away from the hinge box 12. From the third portion 56, the cam surface or cam slot 44 then extends across a fourth, curved portion 58 of the cam surface or cam slot and then through a fifth portion 60 that angles back toward the hinge box 12 and extends to a second edge 62 of the upper cam flange 38. The five portions of the configuration of the cam surface or cam slot 44 in the upper cam flange 38 control the movement of an aircraft door or aircraft passenger door relative to the aircraft fuselage structure as the door is opened from a passenger opening in the aircraft fuselage structure. The configuration of the five portions 48, 54, 56, 58, 60 of the cam surface or cam slot 44 in the upper cam flange 38 is only one example of a possible configuration of the cam surface or cam slot 44 in the upper cam flange 38. The configurations of the cam surfaces or cam slots 44, 46 can be various different configurations, depending on the desired motion of the aircraft door or aircraft passenger door relative to the aircraft fuselage structure made during the opening of the aircraft passenger door from a passenger opening in the aircraft fuselage.

The first linkage 14 has a length between a first end 64 of the first linkage and a second end 66 of the first linkage. The length between the first end 64 of the first linkage and the second end 66 of the first linkage is straight, and is a fixed length. The first end 64 of the first linkage is constructed as a first linkage pivot connection that is connected to the aircraft fuselage structure. The first linkage pivot connection has a third pivot axis 67 that is parallel with the first pivot axis 28 of the first end 24 of the hinge box 12 and with the second pivot axis 36 of the second end 26 of the hinge box 12. The hinge connection at the first end 64 of the first linkage 14 can be any type of hinge connection that enables relative pivoting movement between the first linkage 14 and the aircraft fuselage structure to which the first end 64 of the first linkage 14 is connected.

The second linkage 16 has a length between a first end 68 of the second linkage and a second end 72 of the second linkage. The length between the first end 68 of the second linkage and the second end 72 of the second linkage is straight, and is a fixed length. The first end 68 of the second linkage is constructed as a second linkage pivot connection that is connected to the door fitting 18. The door fitting 18 connects the first end 68 of the second linkage 16 to the second end 26 of the hinge box 12. The hinge connection at the first end 68 of the second linkage 16 can be any type of hinge connection that enables relative pivoting movement between the second linkage 16, and the door fitting 18 about a fourth pivot axis 70. The first pivot axis 28, the second pivot axis 36, the third pivot axis 67 and the fourth pivot axis 70 are all oriented vertically and are all parallel axes.

The cam surface follower 22 is connected to the second end 66 of the first linkage 14 and the second end 72 of the second linkage 16. The cam surface follower 22 provides a pivoting connection between the first linkage 14 and the second linkage 16 that enables relative pivoting movement between the first linkage 14 and the second linkage 16. The cam surface follower 22 that extends through the pivot connection it provides between the second end 66 of the first linkage 14 and the second end 72 of the second linkage 16 has cam rollers 76, 78 at its opposite ends. The cam rollers 76, 78 are positioned on the opposite sides of the pivot connection provided by the cam surface follower 22 between the second end 66 of the first linkage 14 and the second end 72 of the second linkage 16. The cam rollers 76, 78 are cylindrical rollers that are dimensioned to be received in the cam surface or cam slot 44 of the upper cam flange 38 and the cam surface or cam slot 46 of the lower cam flange 42, respectively. The cam roller 76 engages in rolling or sliding contact with the cam surface or cam slot 44 in the upper cam flange 38. The cam roller 78 engages in rolling or sliding contact with the cam surface or cam slot 46 of the lower cam flange 42.

A power assist piston and cylinder assembly 82 is provided in the door translation hinge assembly 10. The power assist piston/cylinder assembly 82 provides mechanical motion input to open the door translation hinge assembly in emergency situations. In emergency situations, the power assist piston/cylinder assembly 82 takes the place of manual force typically used to open the door translation hinge assembly 10 to open an aircraft passenger door in the passenger door opening of the aircraft fuselage structure.

The operation of the door translation hinge assembly 10 in opening an aircraft door or aircraft passenger door 84 in an aircraft passenger door opening 86 of an aircraft fuselage structure 88 is represented in FIGS. 4-10. In FIGS. 4-10, the orientation of the door translation hinge assembly 10 is reversed from the orientation of the door translation hinge assembly 10 represented in FIGS. 1 and 2.

Figure 4:
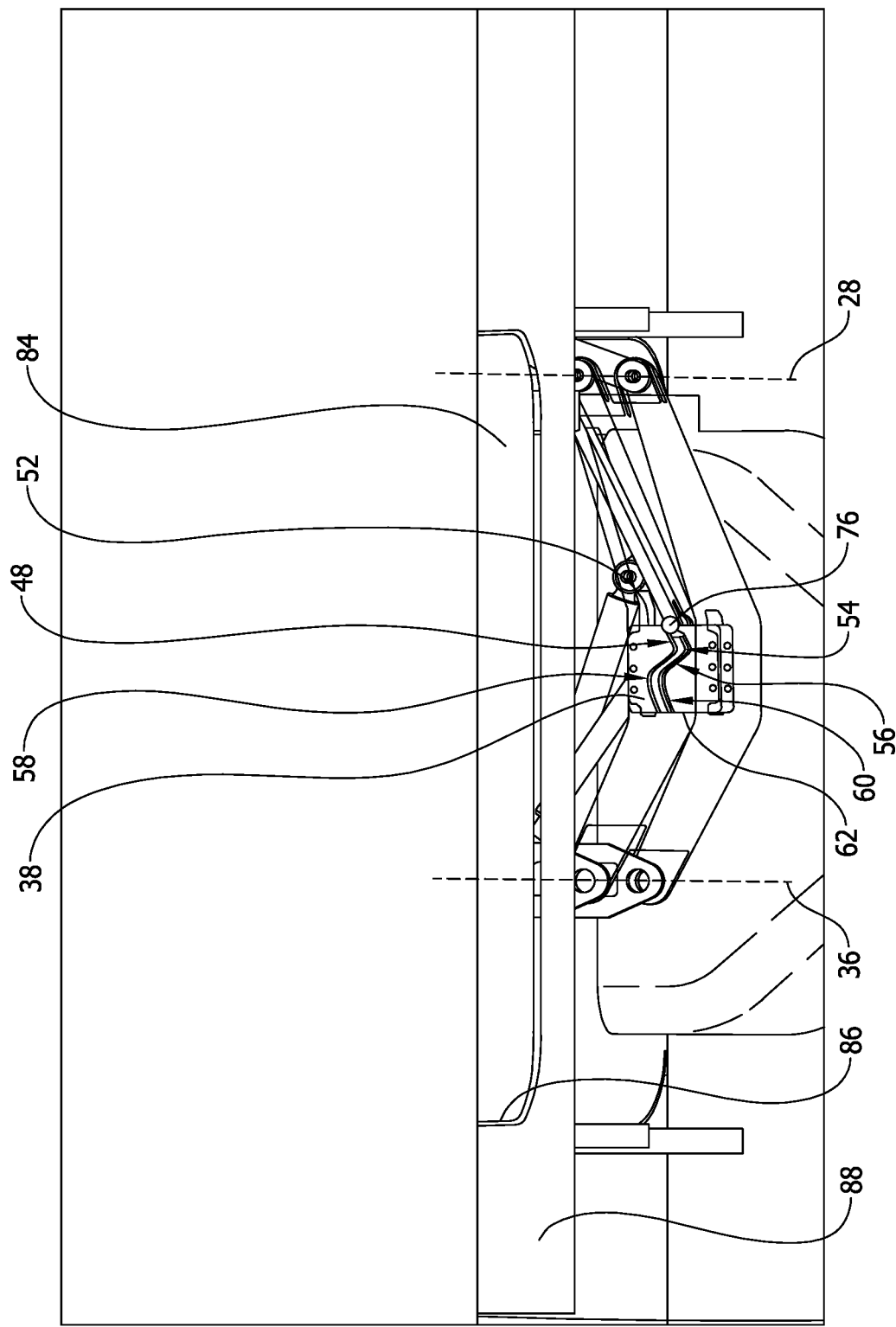
FIGS. 4-10 are representations of top perspective views of the door translation hinge assembly illustrating the pivoting and translation movements of the aircraft door relative to the aircraft fuselage structure during opening of the aircraft door from the passenger opening in the aircraft fuselage structure.

As represented in FIG. 4, the aircraft passenger door 84 or door can be opened manually in the conventional manner by moving a door handle (not shown) to unlock the door 84 and by manually pushing the door 84 outwardly from an aircraft passenger door opening 86 in the aircraft fuselage structure 88. In emergency situations, the power assist piston/cylinder 82 will be activated. The activated power assist piston/cylinder 82 will push the door 84 from the passenger door opening 86 and outward from the fuselage structure 88. The power assist piston/cylinder 82 is only activated in emergency situations. Typically, the door 84 will be manually pushed open from the passenger door opening 86 in the fuselage structure 88.

Figure 5:
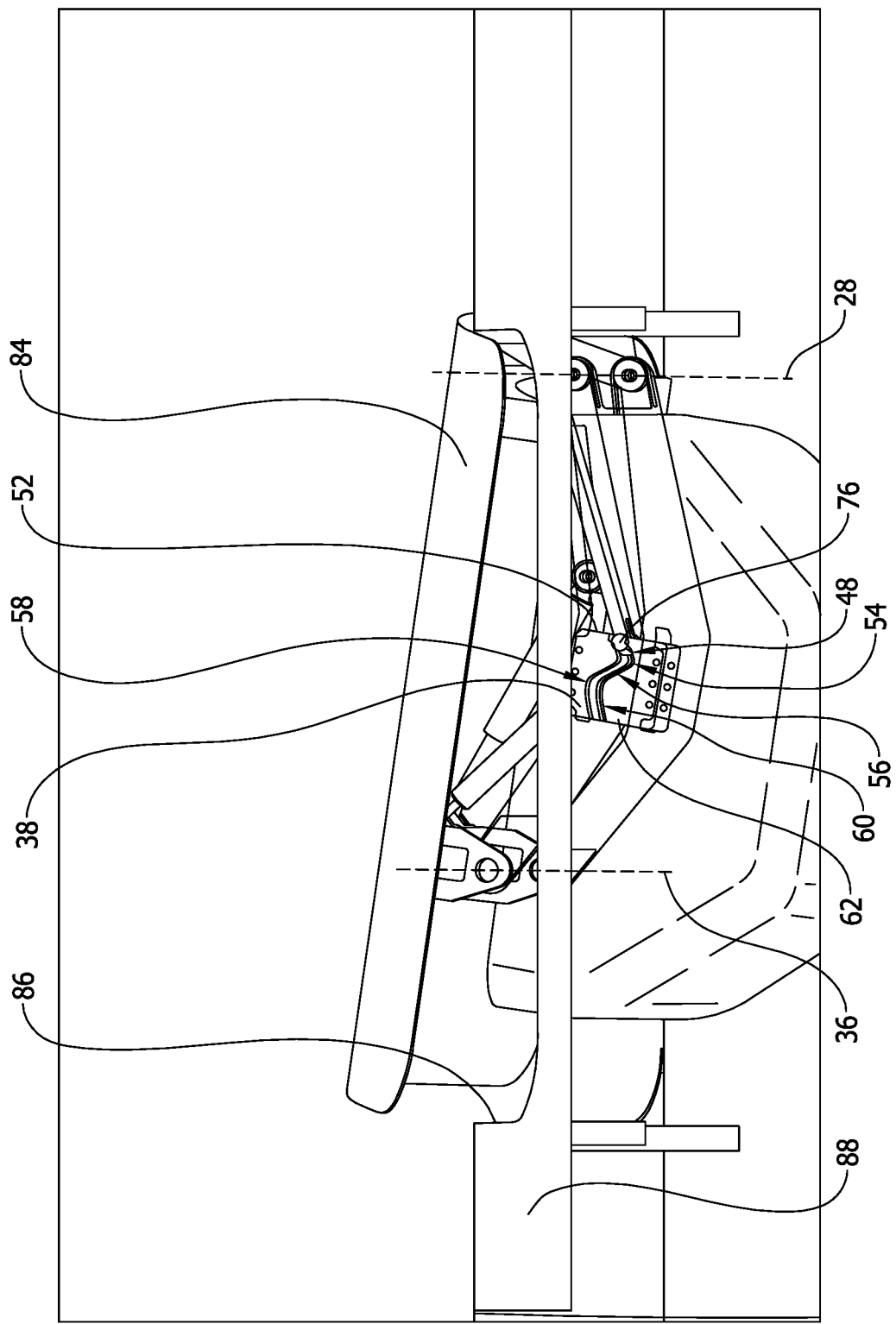

When the door 84 is first opened and pushed from the passenger door opening 86, the door translation hinge assembly 10 and the door 84 rotate about the first pivot axis 28. As represented in FIG. 5, the rotation of the door translation hinge assembly 10 and the door 84 is in a clockwise direction around the first pivot axis 28. As represented in FIG. 5, should the door 84 be opened during flight, the rush of air across the exterior of the aircraft fuselage structure 88 from right to left as viewed in FIG. 5 would impact against the exterior of the door 84 and force the door back to its closed position in the aircraft passenger opening 86. As the door 84 is continued to be opened, the first end 24 of the hinge box 12 rotates about the first pivot axis 28 in a clockwise direction and the second end 26 of the hinge box 12 is moved outward from the aircraft passenger opening 86.

Figure 6:
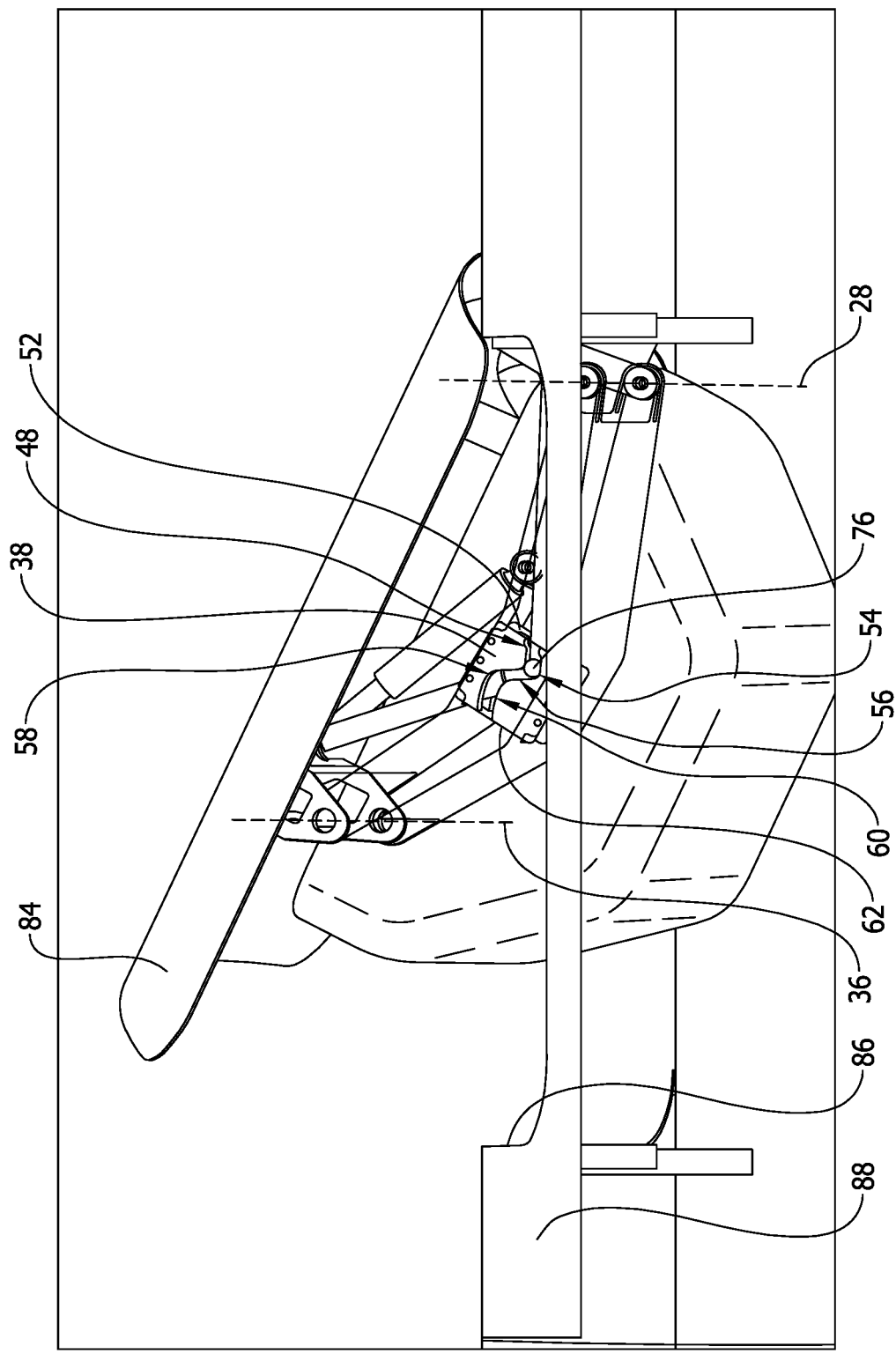
Figure 7:
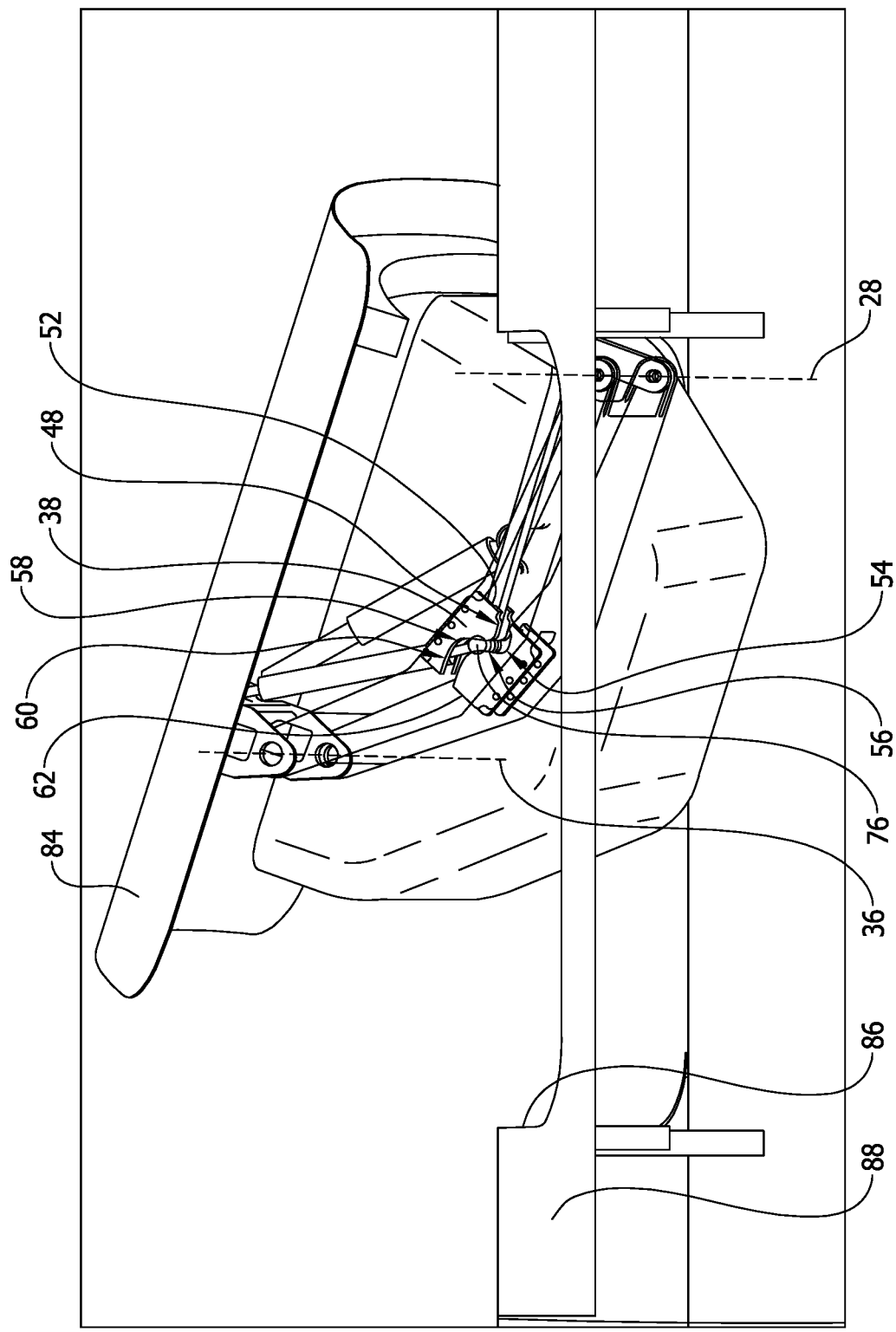
Figure 8:
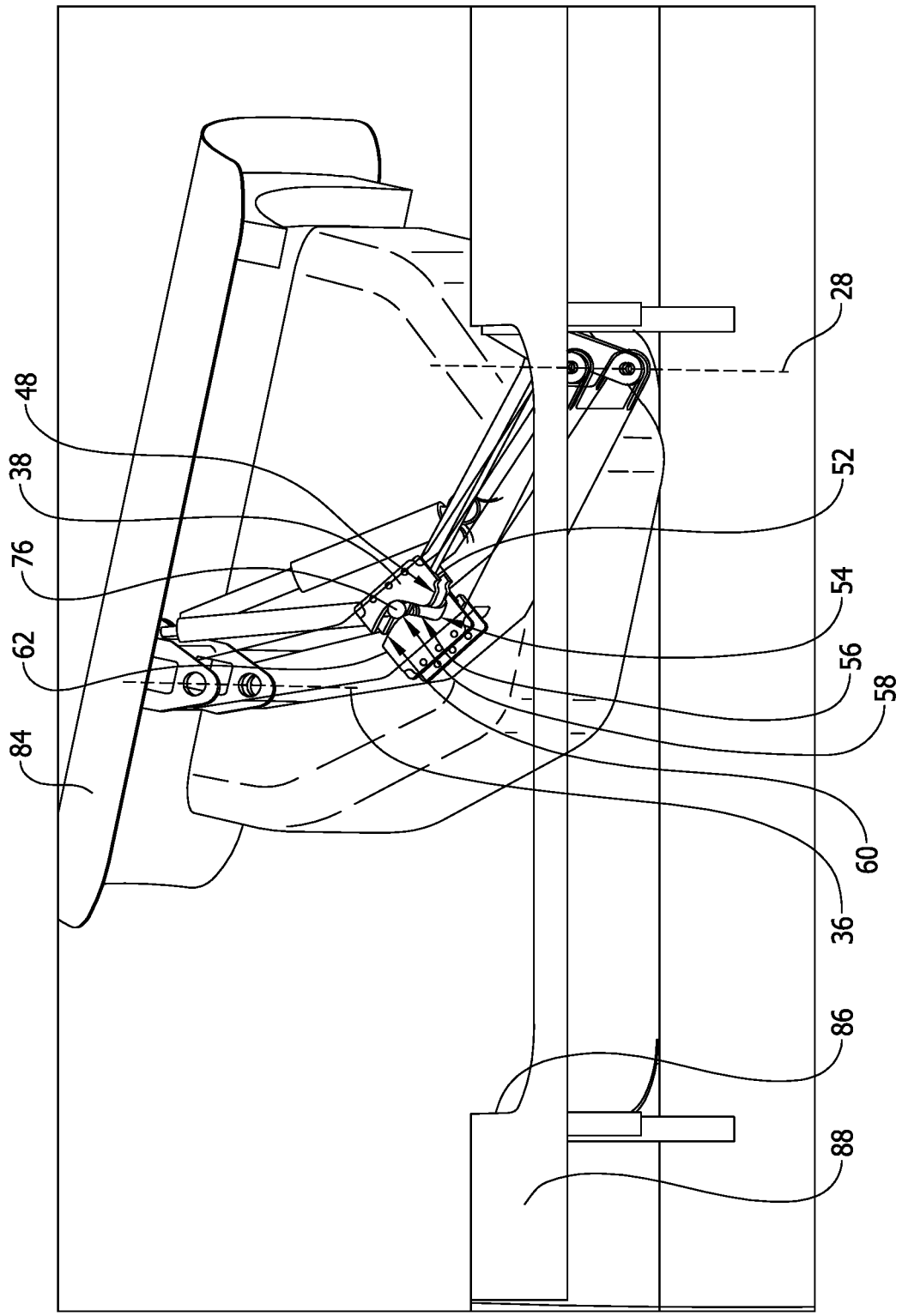

As represented in FIGS. 5 and 6, as the door 84 is continued to be opened, the hinge box 12 continues to rotate in a clockwise direction about the first pivot axis 28 and the first linkage 14 and second linkage 16 move the cam rollers 76, 78 from the first edge 52 of the upper cam flange 42 through the first portion of the cam surface 48 or cam slot. This causes the first linkage 14 and second linkage 16 to control the movement of the door fitting 18 in a counterclockwise pivoting movement about the second pivot axis 36. Thus, the first linkage 14 and second linkage 16 control the orientation of the door 84 about the second pivot axis 36 as the door is continued to be opened, and thereby control the translation movement of the door 84 away from the aircraft fuselage structure 88 and the aircraft passenger opening 86. As represented in FIGS. 6 and 7, as the door 84 is continued to be opened, the cam rollers 76, 78 move through the second portion or curved portion of the cam surface or cam slot 54 and into the third portion of the cam surface or cam slot 56. As the cam rollers 76, 78 travel through the third portion of the cam surface or cam slot 54, the second linkage 16 pushes against the door fitting 18 and causes the door fitting to continue to be pivoted about the second pivot axis 36. The movement of the cam roller 76 and cam roller 78 through the third portion of the cam surface or cam slot 56 is represented in FIGS. 6-8. As represented in FIGS. 6-8, the movement of the passenger door 84 continues out of the passenger opening 86. The door 84 also continues to pivot in a counterclockwise direction about the second axis 36. This moves the door 84 in a translation movement out of the door opening 86 and toward a position of the door outside the aircraft fuselage structure 88.

Figure 9:
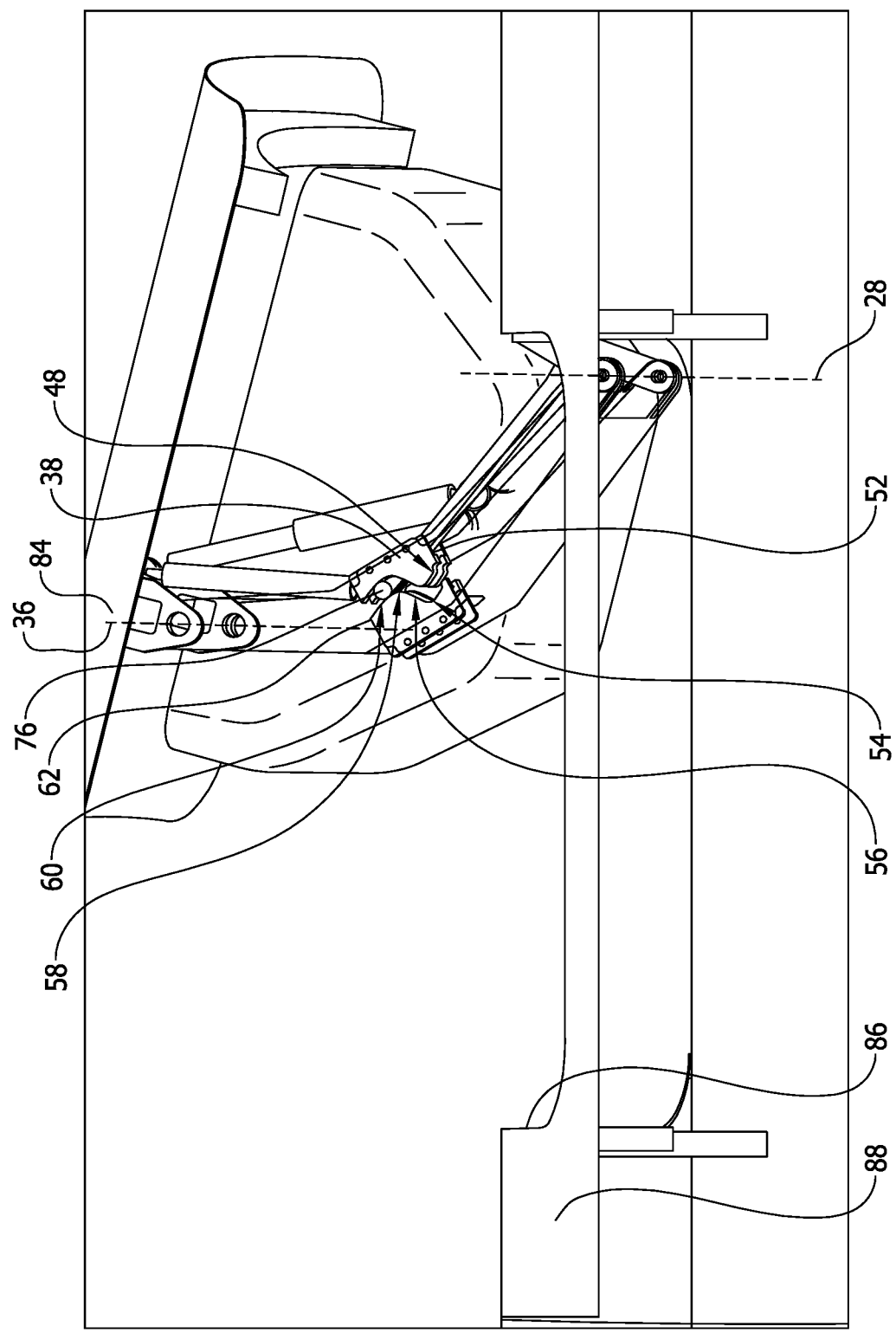
Figure 10:
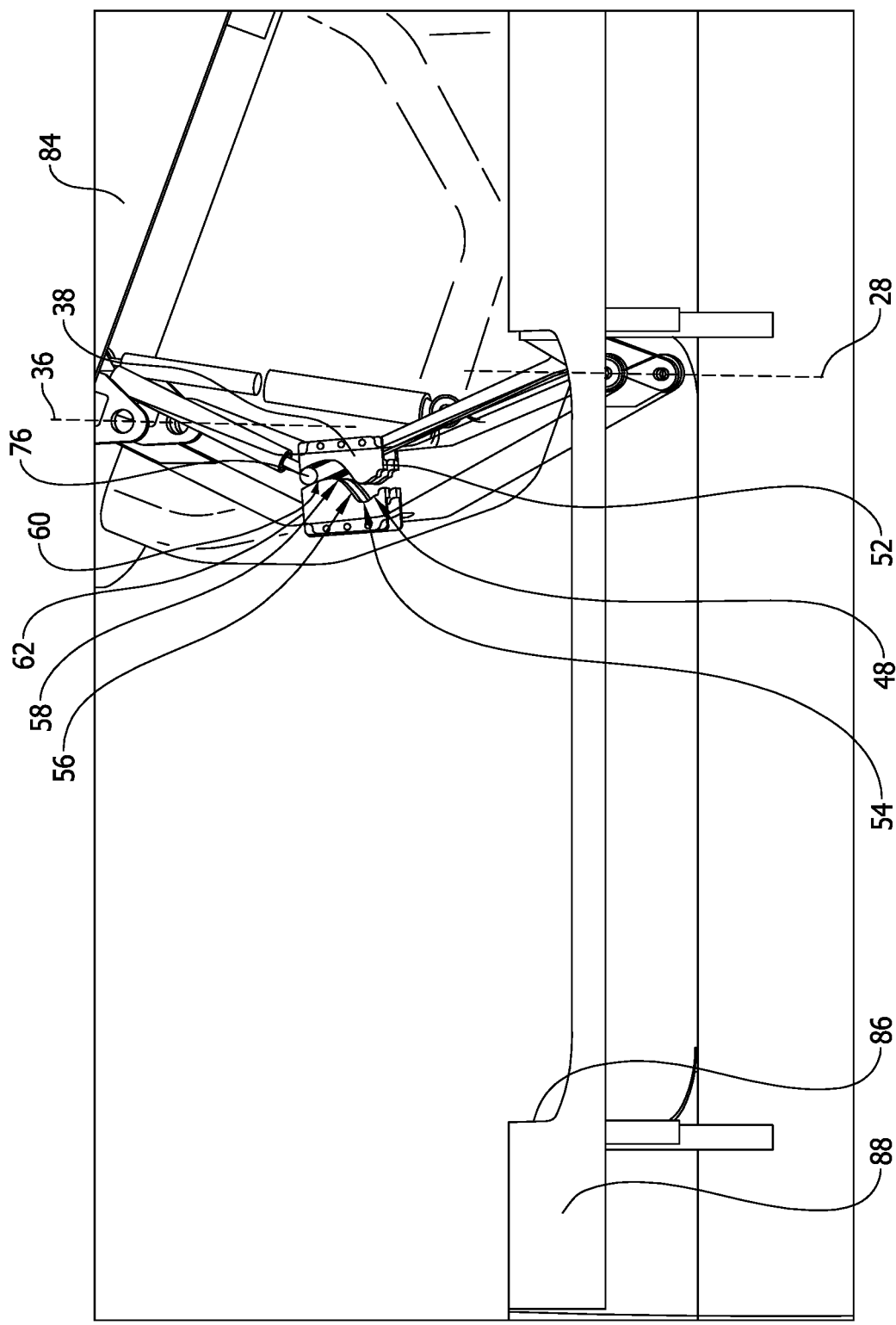

As represented in FIGS. 8-10, as the door 84 is continued to be opened, the hinge box 12 and the first linkage 14 pivot in a clockwise direction about the first pivot axis 28 and the third pivot axis 67, respectively. This causes the cam roller 76 and cam roller 78 to move through the fourth, curved portion of the cam surface or cam slot 56 and then through a fifth portion of the cam surface or cam slot 60 that angles back toward the hinge box 12. The movement of the cam roller 76 and cam roller 78 through the fourth, curved portion of the cam surface or cam slot 58 and then through the fifth portion of the cam surface or cam slot 60 controls movement of the door 84 in a counterclockwise pivoting movement about the second pivot axis 36 and moves the door 84 in a translating movement away from the aircraft passenger opening 86 and over the aircraft fuselage structure 88.

Thus, the simplified construction of the door translation hinge assembly 10 moves the aircraft passenger door 84 from the aircraft passenger door opening 86 and out over the aircraft fuselage structure 88 with a reduced number of parts and without additional mechanisms. This is achieved by the movements of the cam roller 76 through the cam surface or cam slot 44 of the upper cam flange 38 and the cam roller 78 through the cam surface or cam slot 46 of the lower cam flange 42 controlling the movement of the aircraft passenger door 84 as the door is opened.

As various modifications could be made in the construction of the hinge assembly and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A door translation hinge assembly comprising:
   a hinge box having a length between a first end of the hinge box and a second end of the hinge box, the first end of the hinge box being connected to an aircraft fuselage structure;
   a cam surface on the hinge box;
   a first linkage having a length between a first end of the first linkage and a second end of the first linkage, the first end of the first linkage being connected to the aircraft fuselage structure;
   a second linkage having a length between a first end of the second linkage and a second end of the second linkage, the first end of the second linkage being connected to a door fitting; and,
   a cam surface follower connected to the second end of the first linkage and connected to the second end of the second linkage, the cam surface follower engaging with the cam surface for sliding movement of the cam surface follower along the cam surface.

2. The door translation hinge assembly of claim 1, further comprising:
   the cam surface being a cam slot, the cam slot having a length; and,
   the cam surface follower being received in the cam slot for movement of the cam surface follower along the length of the cam slot.

3. The door translation hinge assembly of claim 2, further comprising:
   the cam surface follower being a pivot connection between the second end of the first linkage and the second end of the second linkage, the pivot connection enabling relative pivoting movement between the first linkage and the second linkage about the cam surface follower.

4. The door translation hinge assembly of claim 1, further comprising:
   the first end of the first linkage being connected to the aircraft fuselage structure by a first linkage pivot connection that enables relative pivoting movement between the first linkage and the aircraft fuselage structure about the first linkage pivot connection.

5. The door translation hinge assembly of claim 4, further comprising:
   the first end of the second linkage being connected to the door fitting by a second linkage pivot connection that enables relative pivoting movement between the second linkage and the door fitting about the second linkage pivot connection.

6. The door translation hinge assembly of claim 5, further comprising:
   the first end of the hinge box is connected to the aircraft fuselage structure by a first pivot connection that enables relative pivoting movement between the hinge box and the aircraft fuselage structure about a first pivot axis.

7. The door translation hinge assembly of claim 6, further comprising:
   the second end of the hinge box is connected to the door fitting by a second pivot connection that enables relative pivoting movement between the hinge box and the door fitting about a second pivot axis.

8. The door translation hinge assembly of claim 7, further comprising:
   the door fitting being attached to an aircraft door, the door fitting being connected to the first end of the second linkage and the door fitting being connected to the second end of the hinge box.

9. The door translation hinge assembly of claim 1, further comprising:
   the first linkage having a fixed length between the first end of the first linkage and the second end of the first linkage.

10. The door translation hinge assembly of claim 9, further comprising:
    the second linkage having a fixed length between the first end of the second linkage and the second end of the second linkage.

11. The door translation hinge assembly of claim 1, further comprising:
    the cam surface being positioned on the hinge box intermediate the first end of the hinge box and the second end of the hinge box.

12. A door translation hinge assembly comprising:
    a hinge box having a length between a first end of the hinge box and a second end of the hinge box, the first end of the hinge box being connected to an aircraft fuselage structure;
    a cam surface on the hinge box;
    a door fitting on an aircraft door;
    a door pivot assembly connecting the door fitting to the second end of the hinge box, the door pivot assembly enabling relative pivoting movement between the second end of the hinge box and the door fitting;
    a linkage having a length between a first end of the linkage and a second end of the linkage, the first end of the linkage being connected to the door fitting; and,
    a cam surface follower connected to the second end of the linkage, the cam surface follower engaging with the cam surface for sliding movement of the cam surface follower along the cam surface.

13. The door translation hinge assembly of claim 12, further comprising:
    the cam surface being a cam slot, the cam slot having a length; and,
    the cam surface follower being received in the cam slot for movement of the cam surface follower along the length of the cam slot.

14. The door translation hinge assembly of claim 12, further comprising:
    the first end of the hinge box being connected to the aircraft fuselage structure for relative pivoting movement between the hinge box and the aircraft fuselage structure.

15. The door translation hinge assembly of claim 12, further comprising:
    the first end of the linkage being connected to the door fitting by a pivot connection that enables relative pivoting movement between the linkage and the door fitting.

16. The door translation hinge assembly of claim 12, further comprising:
- the linkage being a second linkage, the second linkage having a length between a first end of the second linkage and a second end of the second linkage, the first end of the second linkage being connected to the door fitting; and,
- a first linkage having a length between a first end of the first linkage and a second end of the first linkage, the first end of the first linkage being connected to the aircraft fuselage structure by a pivot connection that enables relative pivoting movement between the first linkage and the aircraft fuselage structure.

17. The door translation hinge assembly of claim 16, further comprising:
- the cam surface follower being connected to the second end of the second linkage; and,
- the second end of the first linkage being connected to the cam surface follower.

18. The door translation hinge assembly of claim 17, further comprising:
- the cam surface follower being a pivot connection between the second end of the first linkage and the second end of the second linkage, the pivot connection enabling relative pivoting movement between the first linkage and the second linkage about the cam surface follower.

19. A method of enabling translation movement of an aircraft door relative to an aircraft structure, the method comprising:
- connecting a first end of a first linkage to the aircraft structure, the first linkage having a length between the first end of the first linkage and a second end of the first linkage;
- connecting a first end of a second linkage to the aircraft door, the second linkage having a length between the first end of the second linkage and a second end of the second linkage;
- connecting a first end of a hinge box to the aircraft structure and connecting a second end of the hinge box to the aircraft door;
- connecting a cam surface follower to the second end of the first linkage and to the second end of the second linkage; and,
- engaging the cam surface follower with a cam surface on the hinge box for sliding movement of the cam surface follower along the cam surface.

20. The method of claim 19, further comprising:
- engaging the cam surface follower with the cam surface in a cam surface slot, the cam surface slot being on the hinge box.

* * * * *